United States Patent [19]

Ball et al.

[11] Patent Number: 5,195,719
[45] Date of Patent: Mar. 23, 1993

[54] BUTTERFLY VALVES WITH ACTUATORS CARRIED ON VALVE PLATE

[75] Inventors: Larry K. Ball, Chandler; Marshall U. Hines, Scottsdale, both of Ariz.

[73] Assignee: Allied-Signal Inc., Morris Township, Morris County, N.J.

[21] Appl. No.: 898,225

[22] Filed: Jun. 12, 1992

Related U.S. Application Data

[63] Continuation of Ser. No. 374,897, Jun. 30, 1989, abandoned.

[51] Int. Cl.$^5$ .............................................. F16K 1/22
[52] U.S. Cl. ........................................ 251/56; 251/58; 251/227; 251/228; 251/218; 251/305; 251/308
[58] Field of Search ................... 251/56, 58, 160, 215, 251/227, 228, 218, 281, 283, 305, 308

[56] References Cited

U.S. PATENT DOCUMENTS

| | | |
|---|---|---|
| 212,556 | 2/1879 | Johnson . |
| 443,326 | 12/1890 | Leverich . |
| 932,172 | 8/1909 | Porter et al. . |
| 965,322 | 7/1910 | Peterson . |
| 1,167,145 | 1/1916 | Baverey . |
| 1,328,565 | 1/1920 | Howard .......................... 251/308 X |
| 1,541,047 | 6/1925 | Hart ...................................... 251/308 |
| 1,744,798 | 1/1930 | Price . |
| 2,051,881 | 8/1936 | Mock . |
| 2,095,263 | 10/1937 | Moss . |
| 2,271,390 | 1/1942 | Dodson . |
| 2,796,082 | 6/1957 | Green et al. . |
| 2,833,511 | 5/1958 | Fletcher .......................... 251/218 X |
| 2,910,266 | 10/1959 | Condello .......................... 251/56 X |
| 3,008,685 | 11/1961 | Rudden ............................ 251/160 |
| 3,062,232 | 11/1962 | McGay . |
| 3,065,950 | 11/1962 | Goldberg ......................... 251/160 |
| 3,200,838 | 8/1965 | Sheaffer . |
| 3,298,659 | 1/1967 | Cupedo . |
| 3,344,808 | 10/1967 | Cary . |
| 3,400,907 | 9/1968 | Horn et al. . |
| 3,442,489 | 5/1969 | Cary et al. . |
| 3,516,640 | 6/1970 | Bryer et al. . |
| 3,545,486 | 12/1970 | Larson . |
| 3,675,681 | 7/1972 | Obermaler . |
| 3,677,297 | 7/1972 | Walton . |
| 3,794,288 | 2/1974 | Dolder et al. ...................... 251/58 |
| 3,960,177 | 6/1976 | Baumann . |
| 3,971,414 | 7/1976 | Illing . |
| 3,982,725 | 9/1976 | Clark ............................. 251/58 X |
| 3,993,096 | 11/1976 | Wilson . |
| 4,084,617 | 4/1978 | Happe . |
| 4,190,074 | 2/1980 | Mailliet et al. . |
| 4,313,592 | 2/1982 | Baas ................................... 251/58 |
| 4,367,861 | 1/1983 | Bray et al. . |
| 4,508,132 | 4/1985 | Mayfield, Jr. et al. . |
| 4,534,538 | 8/1985 | Buckley et al. ..................... 137/527 |
| 4,556,192 | 12/1985 | Ramisch . |
| 4,586,693 | 5/1986 | Tinner . |
| 4,706,706 | 11/1987 | Page et al. . |
| 4,712,768 | 12/1987 | Herr et al. . |

FOREIGN PATENT DOCUMENTS

| | | |
|---|---|---|
| 2821766 | 11/1979 | Fed. Rep. of Germany ...... 251/160 |
| 1533073 | 11/1978 | United Kingdom . |

OTHER PUBLICATIONS

"Fishtail vs. Conventional Discs in Butterfly Valves", Carl D. Wilson, Instruments & Control Systems/vol. 41, Mar. 1968.

"The Note on the Reduction of the Fluid Dynamic Torque of Butterfly Valves", D. W. Bryer and D. E. Walshe, National Physical Laboratory, Aerodynamics Division, Sep. 1966.

*Primary Examiner*—Robert G. Nilson
*Attorney, Agent, or Firm*—Joseph R. Black; Terry L. Miller; Robert A. Walsh

[57] ABSTRACT

A butterfly valve (30) in which an actuator (38) is secured to the plate (36). The actuator (38) is carried with the plate (36) when the latter moves. The plate (36) may be revolvable and translatable relative to the shaft (42). The actuator (38) may be used to open and adjust a pilot valve (94) secured to and carried with the plate (36), and to revolve or translate the plate (36) relative to the shaft (42) in order to vary hydrodynamic torque exerted on the plate (36).

53 Claims, 4 Drawing Sheets

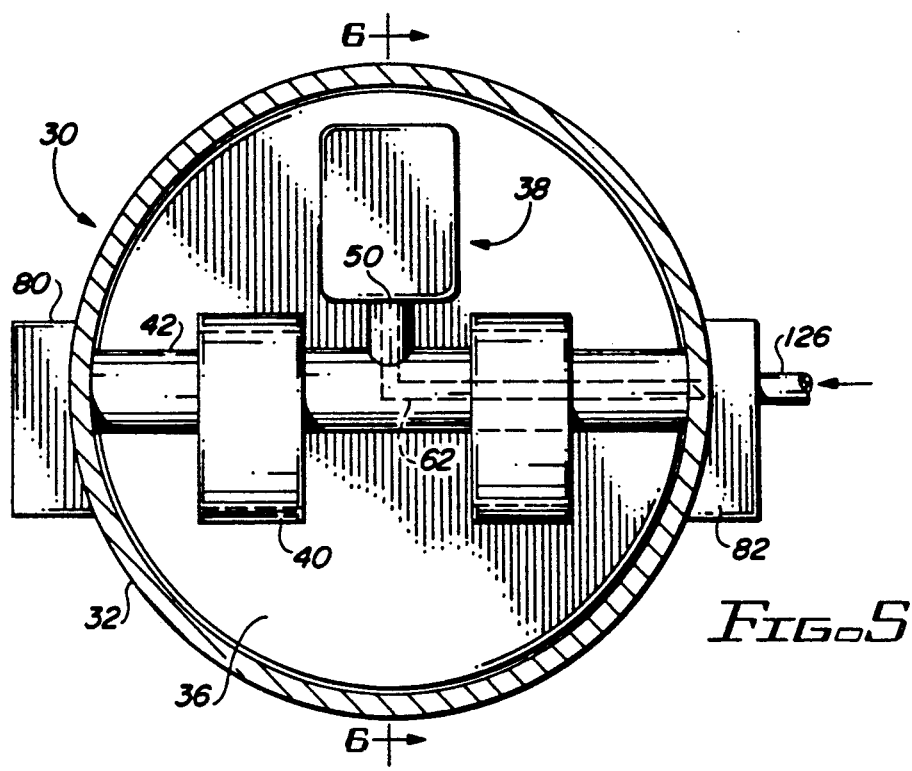
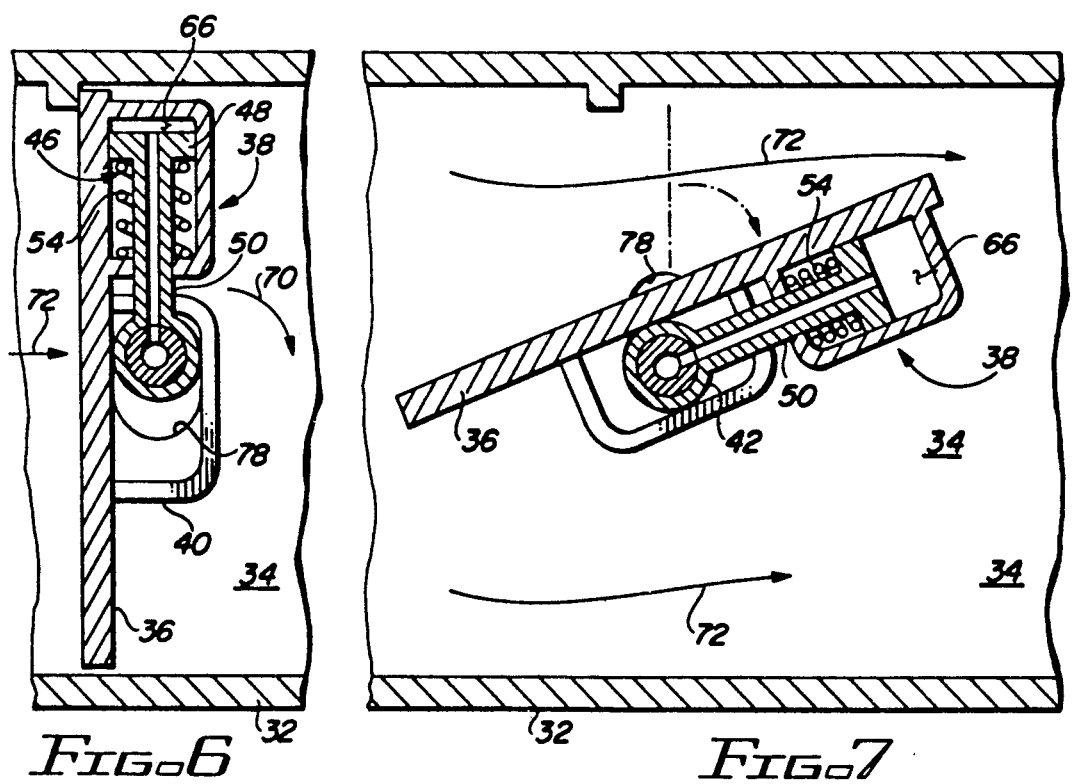

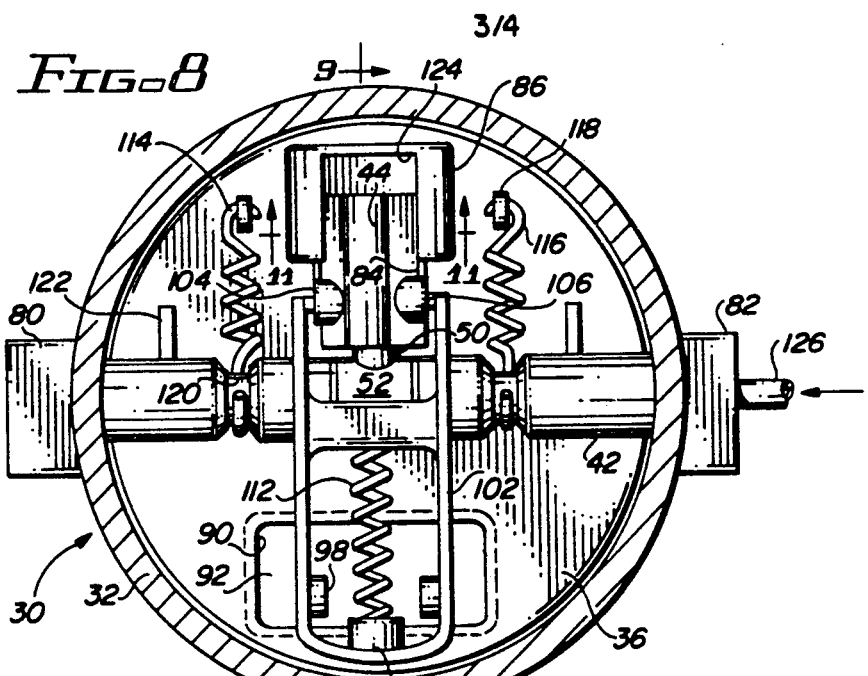
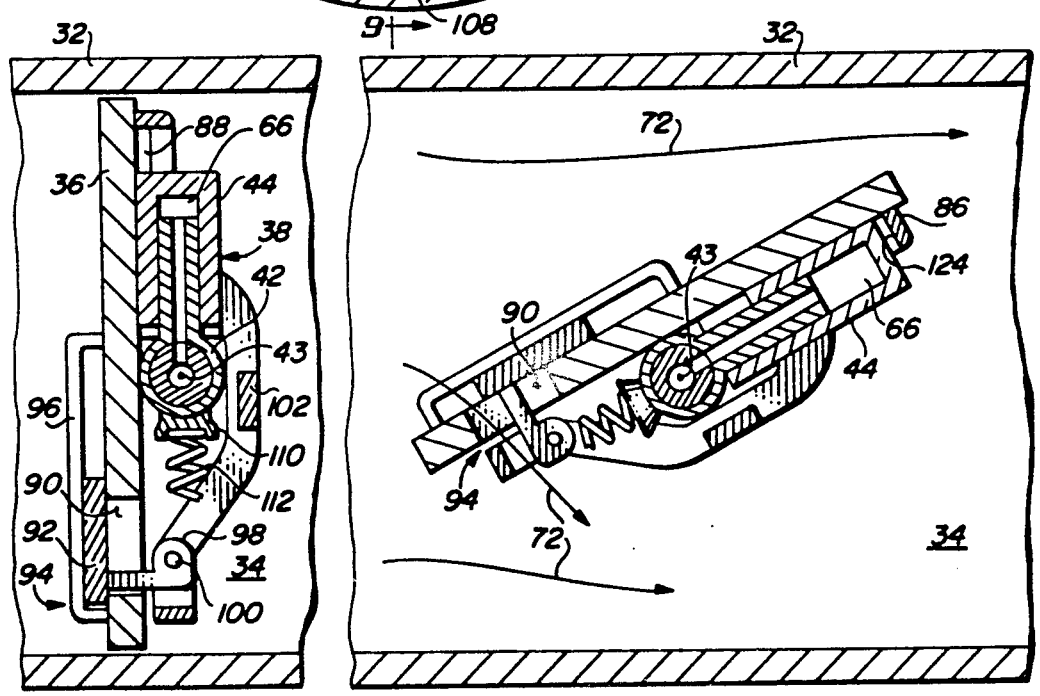
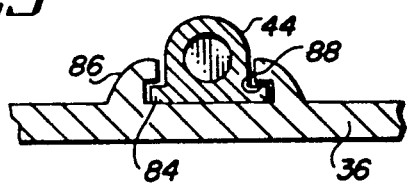

BUTTERFLY VALVES WITH ACTUATORS CARRIED ON VALVE PLATE

This application is a continuation of application Ser. No. 374,897, which was filed on Jun. 30, 1989, now abandoned.

TECHNICAL FIELD

The present invention relates generally to butterfly valves. More specifically, the invention relates to such valves that incorporate novel means for moving or retaining the position of a butterfly plate subjected to aerodynamic or hydrodynamic forces which tend to resist such movement or retention.

BACKGROUND OF THE INVENTION

FIG. 1 of the accompanying drawings schematically illustrates a conventional butterfly valve arrangement 10 in which a butterfly plate 12 positioned in a duct 14 is rotated about an axis 15 defined by a spindle or shaft 16 in order to vary the rate at which fluid (indicated by the arrow 72) flows through the duct. Typically, the plate 12 is rotated via torque applied by an external actuator 20 through the shaft 16.

A series of arrows 22 generally illustrates the static pressure profile resulting from the hydrodynamic forces acting on the butterfly plate 12. The overall effect of the static pressure may be represented by a center of pressure (indicated by the dashed arrow 24) which tends to force the plate 12 to the closed position. This force must be countered or overcome by energy supplied to the actuator 20 in order to retain the position of the plate 12 or further open the valve 10.

As a general matter, in order to lower the energy required to match or exceed the hydrodynamic forces acting on the plate 12, the center of pressure 24 should be favorably altered in relation to the axis 15 of rotation. That is, either the center of pressure 24 should be aligned with or moved closer to the shaft 16, or the shaft should be aligned with or moved closer to the center of pressure.

Prior approaches to designing butterfly valves appear to have embodied the various assumptions described below, each of which is rejected for particular embodiments of the present invention, and all of which are rejected for preferred embodiments thereof.

A first of these assumptions, applicable to butterfly valves with internally-disposed actuators, is that the actuator 20 should be secured to the duct 14 with its output arm secured to the plate 12, thereby operating in a push-pull mode to control the position of the plate (see, e.g., U.S. Pat. No. 3,794,288). Positioning the actuator in that manner limits practicable design options and can result in unnecessarily high flow obstruction by the actuator. Accordingly, the present invention rejects this first assumption for all embodiments thereof, and provides heretofore unrecognized advantages in the design and operation of butterfly valves.

A second of the assumptions is that the hydrodynamic forces acting on the plate 12 must be overcome through brute force applied by torquing the shaft 16, or by pushing on the plate. A partial exception thereto is the invention disclosed in U.S. Pat. No. 3,971,414 Illing. Illing provides a butterfly valve in which a servo-tab portion of the plate 12 is angled relative to the remainder as needed to compensate for excessive hydrodynamic forces otherwise acting on the plate at various rotational positions. The servo-tab portion is angled in response to torque which is applied to the shaft 16 and transferred to the servo-tab via a combination of mechanical linkage elements secured to the shaft and the plate 12. The present invention rejects this assumption and differs substantially from the Illing invention for reasons which will become evident from the following text.

A third of the assumptions is that the relative motion between the plate 12 and the shaft or spindle 16 is one of simple rotation. This assumption is understandable in view of the fact that in order to close the valve 10, the diameter of the plate 12 must be substantially the same as the inside diameter of the duct 14 unless a stepped duct is provided. However, acceptance of this assumption eliminates from consideration a number of advantageous design options. As is further explained by the following description, which includes the appended claims and accompanying drawings, the present invention rejects this assumption for preferred embodiments thereof. In these embodiments, the plate is secured to the pivot shaft in such manner that it is both revolvable and translatable relative to the shaft. This arrangement provides the ability to achieve closer alignment of the center of pressure 24 with the shaft when the valve is open, thus reducing the externally-supplied energy required to maintain a given flow rate, and further provides for far more use of hydrodynamic force in adjusting flow rates. This in turn should provide the ability to use smaller actuators, thereby lowering the overall weight of the butterfly valve structure.

An objective of the invention is to provide smaller and lighter butterfly valves.

Another objective is to provide butterfly valves having less sensitivity to vibration.

A further objective is to reduce the energy that is required to operate butterfly valves.

A still further objective is to provide butterfly valves with internally-disposed actuators which are positioned to minimize obstruction to flow.

SUMMARY OF THE INVENTION

The salient feature of the invention is the securement of an actuator to the plate member of the butterfly valve such that the actuator is carried by the plate member at all times.

The invention discloses a number of additional structural features which illustrate the importance of the above-recited feature. Each of these, however, has its own unique advantage.

One such feature is a pilot valve carried by the plate member. The pilot valve is opened by the actuator to effect opening of the butterfly valve, and can be used to variably open the latter. This feature provides the ability to change the area over which hydrodynamic forces act on the plate member, which in turn varies the location of the center of pressure associated with those forces.

Another feature is the securement of the plate member to the shaft such that the former is revolvable and translatable relative to the latter. This feature is considered to be of paramount importance, and provides the ability to achieve substantial reduction in the externally supplied energy which is required to regulate butterfly valves. The actuator can be used in a variety of ways to translate the plate member relative to the shaft so that the center of pressure can be positioned to minimize hydrodynamic torque exerted on the plate member (where it is desired to maintain a given flow rate), or to revolve the plate member relative to the shaft (where it is desired to change the flow rate).

A third feature, applicable to those embodiments which incorporate the immediately forementioned feature, is mechanical timing of the plate member relative to the shaft. This feature provides slip-free movement between the shaft and the plate member in order to avoid calibration drifts. In addition, it facilitates a rolling motion of the plate member around a fixed shaft in particular embodiments of the invention.

Other features will be evident from the following description.

BRIEF DESCRIPTION OF THE DRAWINGS

FIGS. 5, 6, and 7, are views substantially corresponding in kind to those of FIGS. 2, 3, and 4, and illustrate a second embodiment of the invention.

FIGS. 8, 9, and 10, are views substantially corresponding in kind to FIGS. 2, 3, and 4, and illustrate a third embodiment of the invention. In FIG. 9, portions of certain components are omitted for clarity.

FIG. 11 is a partial cross-sectional view taken along line 11—11 of FIG. 8.

DESCRIPTION OF THE PREFERRED EMBODIMENTS

Figures 2, 3:
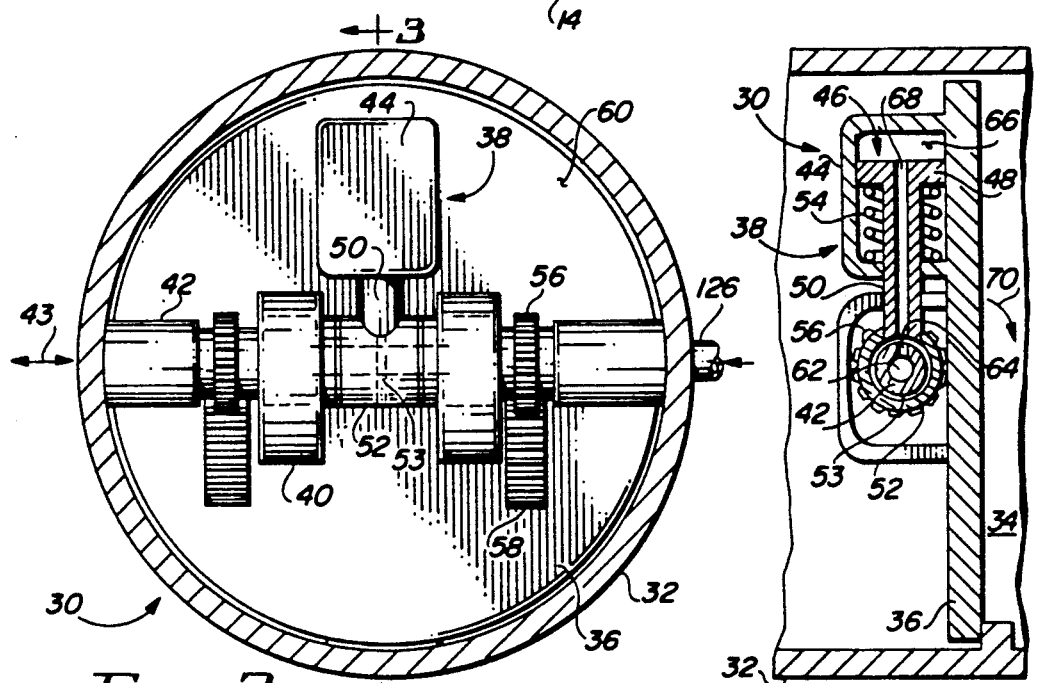
FIG. 2 is a generally elevational, and partially cross-sectional view of a butterfly valve according to a first embodiment of the invention.
FIG. 3 is a cross-sectional view taken along line 3—3 of FIG. 2.

FIGS. 2 and 3 illustrate a butterfly valve 30 comprising a duct 32 defining an elongate flow path 34 for fluid, a plate-like valve member 36 (hereinafter "plate") rotatable between a closed position spanning the flow path and a fully open position (see FIG. 4) associated with a maximum fluid communication along the path, and a pneumatically-driven, piston-type actuator 38 mounted on the plate. Two generally C-shaped brackets 40 are welded at their respective ends to the plate 36, and a pivot shaft 42 extends between the plate and the brackets. As is best seen in FIG. 3, the plate 36 is secured to the pivot shaft 42 in such manner that it is both revolvable and translatable relative to the longitudinal axis 43 of the shaft. The range of revolutionary movement is limited by hydrodynamic forces, and the range of translational movement is limited by the brackets 40. The pivot shaft 42 extends transversely across the flow path 34 and is rigidly secured to the duct 32 so that it is prevented from rotating.

The actuator 38 comprises a housing 44 and a piston 46. The piston 46 has a head 48 slidably disposed within the housing 44 and an output shaft 50 that extends outwardly from the housing. A cylindrical sleeve 52 rotatable about a centrally-disposed, recessed portion of the pivot shaft 42 is welded to the output shaft 50, thus revolvably securing the actuator 38 to the pivot shaft. A biasing spring 54 surrounds the output shaft 50 where the latter extends into the housing 44, and tends to retain the plate 36 in the closed position indicated by FIGS. 2 and 3.

The pivot shaft 42 is formed from two axially extending portions which are rigidly intersecured by any suitable means. This is done so that the cylindrical sleeve 52 can be secured to the pivot shaft 42 while providing minimal axially-directed play between the sleeve and the shaft. As one alternative, stops could be welded to a single-portion pivot shaft on either side of the cylindrical sleeve 52 once the latter is positioned on the shaft. The pivot shaft 42 has two pinion gears 56 which engage two rack gears 58 on the plate 36. These gears 56, 58 may be rigidly secured to the shaft 42 and plate 36, respectively, or may be integrally formed thereon. To minimize binding, the gears 56, 58 should be appropriately dimensioned so that the contact points therebetween are nominally flush with the surface 60 of the plate 36.

The pivot shaft 42 has a longitudinally-extending passage 62 and a connecting passage 64 providing fluid communication between an external source (not shown) of pressurized air and a pressure chamber 66 formed in the actuator 38. The piston 46 has an axially-extending passage 68 to accommodate the forementioned fluid communication. The cylindrical sleeve 52 has an inside, annular recess 53 to provide continuous communication between the connecting passage 64 and the passage 68 as the actuator 38 revolves relative to the pivot shaft 42.

In operation, the plate 36 is rotated away from the closed position by pressurizing the chamber 66. Pressurization of the chamber 66 causes the plate 36 to rotate in the direction indicated by the arrow 70. (note the moment arm defined between contact of the plate 36 and shaft 42, and the center of the chamber 66). Essentially, the plate 36 rolls around the fixed pivot shaft 42, and the rolling motion effects translation of the plate relative to its axis of revolution (the axis of revolution being the longitudinal axis 43 of the pivot shaft 42). The chamber 66 may be depressurized via a conventional external pressure regulator (not shown) that provides for two-way communication through the channels 62, 64, 66, or via bleed holes (not shown) provided in the housing 44 to permit flow from the chamber to the flow path 34.

Figure 4:
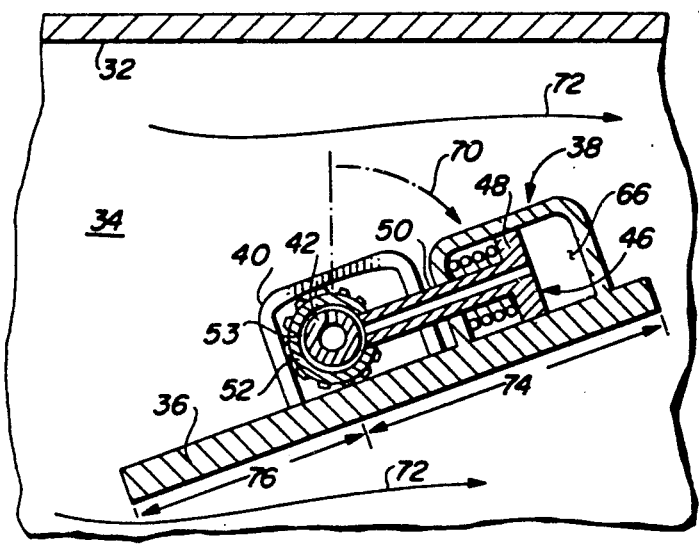
FIG. 4 is a cross-sectional view as in FIG. 3, showing the butterfly valve in an open position.

The arrows 72 in FIG. 4 indicate the direction in which fluid (typically, air) flows through the duct 32. Since the plate 36 translates relative to its axis of revolution as it rolls around the pivot shaft 42, the area of the plate on one side (indicated in a single dimension by arrow 74) of the axis 43 is made greater than the area on the other side (indicated by arrow 76). This effectively moves the center of pressure 24 (FIG. 1) associated with the hydrodynamic forces acting on the plate 36 to a position more closely aligned with the axis 43.

FIGS. 5 and 6 illustrate a second embodiment of the invention. The actuator 38 is secured to the plate 36 and pivot shaft 42 as in the embodiment of FIGS. 2 and 3. The pivot shaft 42 extends into eccentric slots (as at 78) formed in duct bosses 80, 82. Bearings (not shown) are provided on each end of the shaft 42 where the latter extends into the slots 78. In the closed position of the valve 30 as indicated in FIG. 6, the pivot shaft 42 is centered relative to the flow path 34 and positioned at the top of the eccentric slots 78. To open the valve 30, the pivot shaft 42 is displaced downwardly (as viewed in FIG. 6) in the slots 78 by pressurizing the chamber 66. This translates the shaft 42 relative to the plate 36, and relative to the center of pressure 24 (FIG. 1) associated with the hydrodynamic forces acting thereon.

Consequently, the plate 36 rotates to an open position as is generally indicated by FIG. 7. When the plate 36 is in an open position, it can be translated in either direction by suitably adjusting the pressure in the chamber 66. The friction between the pivot shaft 42 and plate 36 resists the translational movement of the plate 36, but is minimized since the pivot shaft 42 is free to rotate via the bearings. A very small clearance is provided between the brackets 40 and the shaft 42.

FIGS. 8 and 9 illustrate a third embodiment of the invention. The actuator 38 is revolvably secured to the pivot shaft 42 as in the above-described embodiments. The housing portion 44 of the actuator 38 has flanges 84 (FIG. 11). A generally U-shaped guide 86 is rigidly secured to the plate 36 and defines a slot 88 along which the flanges 84 are slidable in opposing directions which are parallel to the plate. The flanges 84 and guide 86 are dimensioned so that at least a longitudinally-extending portion of the former is always within the slot 88, thus securing the actuator 38 to the plate 36. The plate 36 has an opening 90 which cooperates with a slidable gate member 92 to form a pilot valve 94. Two spaced guides 96 (only one being shown in FIG. 9) rigidly secured to the plate 36 serve the purpose of guiding movement of the gate member 92 while retaining the latter to the plate. The gate member 92 has two bosses (as at 98), each having a hole 100. The gate member 92 is secured to one end of a mechanical linkage element 102 by pins (not shown) which extend through the holes 100 and the linkage element. Two bosses (as at 104) on the housing 44 have sockets (not shown) which receive two pintle portions (as at 106) of the linkage element 102, thus securing the latter to the housing 44. Bosses 108, 110 on the linkage element 102 and cylindrical sleeve 52, respectively, are provided with suitable means for attaching the ends of a compressed spring 112. Two extension springs 114, 116 are secured under tension between bosses (as at 118) which are welded to the plate 36 and recessed portions (as at 120) of the pivot shaft 42, as indicated in FIG. 8. Two stops (as at 122) are welded to the plate 36 and define a reference position of the plate relative to the pivot shaft 42 when the valve 30 is closed. The compressed spring 112, acting through the linkage element 102, biases the pilot valve 94 shut. The two springs 114, 116 bias the plate 36 toward the forementioned reference position.

In operation, the valve 30 is opened by pressurizing the chamber 66. When the chamber 66 is sufficiently pressurized to overcome the force exerted by the compressed spring 112, the housing 44 moves toward an abutment 124 defined by the U-shaped guide 86. In moving toward the abutment 124, the housing 44 cooperates with the linkage element 102 to lift the gate member 92, thus opening the pilot valve 94. Opening the pilot valve 94 reduces the area of the plate 36 on one side of the pivot shaft 42, thus relocating the center of pressure 24 (FIG. 1) above the longitudinal axis 43 of the shaft 42. The plate 36 thereby moves to an open position as indicated in FIG. 10. Further pressurization of the chamber 66 presses the housing 44 against the abutment 124 and effects translational movement of the plate 36 relative to the axis 43. When the chamber 66 is depressurized, the extension springs 114, 116 act to move the plate 36 in the opposite direction until limited by the stops 122, and the compressed spring 112 acts to close the pilot valve 94 while the housing 44 is returned to a null position.

Figure 1:
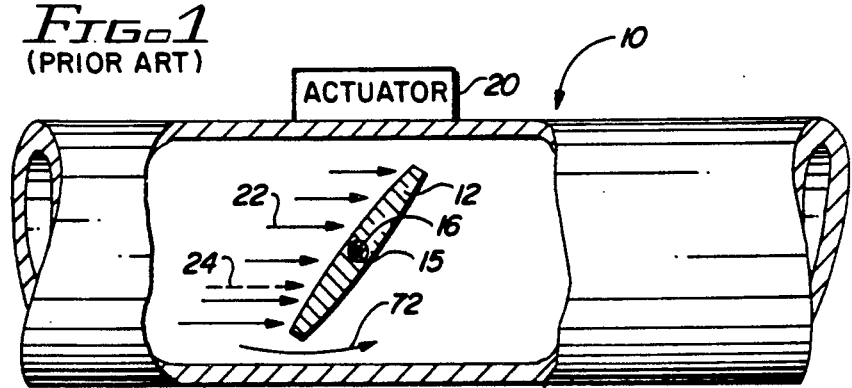
FIG. 1 is a generally cross-sectional and partially schematic illustration of a conventional butterfly valve arrangement.

In the above-described embodiments of the invention, it is assumed that translational movement of the plate 36 relative to its axis of revolution is to be preferred over the conventional arrangement illustrated in FIG. 1. Advantages associated with such movement have been described above. However, there are unique advantages associated with mounting the actuator 38 on the plate 36, irrespective of the manner in which the plate is rotated or stabilized. First, an actuator so mounted provides a ready, local means for opening a pilot valve and for selectively adjusting flow through the pilot valve. Second, an actuator so mounted obstructs flow to a lesser degree than does an actuator mounted to the duct. Third, an actuator so mounted, and substantially centered relative to that portion of the pivot shaft 42 which is defined by the duct, should render the butterfly valve less sensitive to vibration than arrangements in which the actuator is externally mounted. Fourth, an actuator so mounted provides many possible arrangements for opening and adjusting the butterfly valve, only a few of which are disclosed herein.

Figure 12:
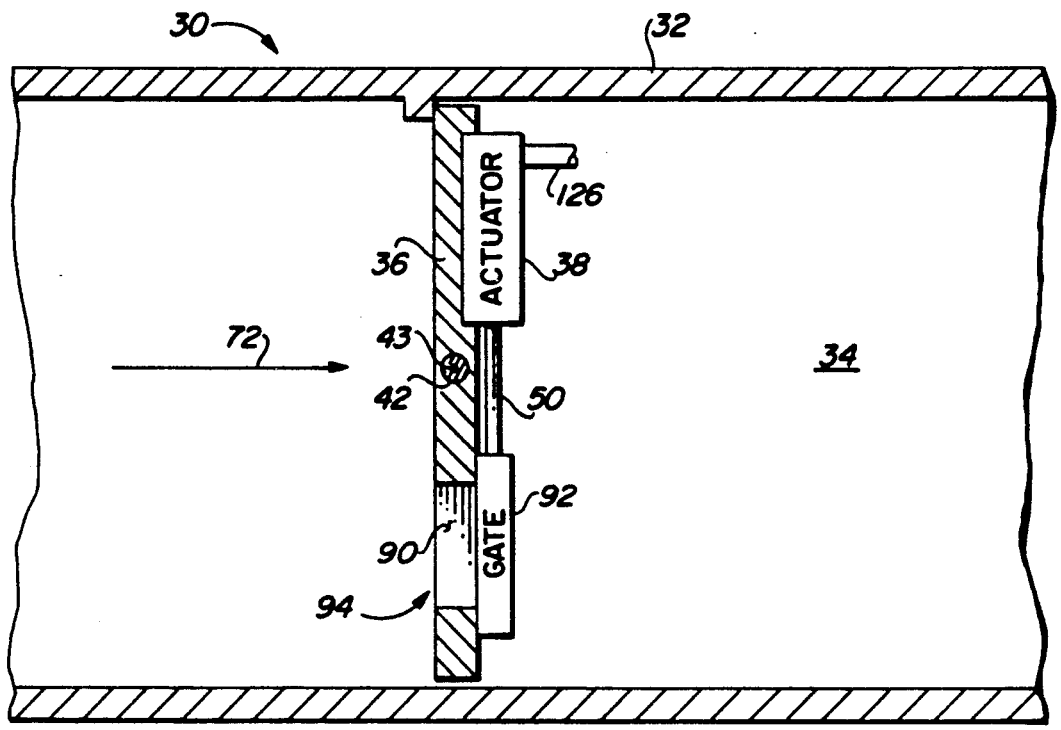
FIGS. 12 and 13 are generally schematic and partially cross-sectional views illustrating additional embodiments of the invention.
Figure 13:
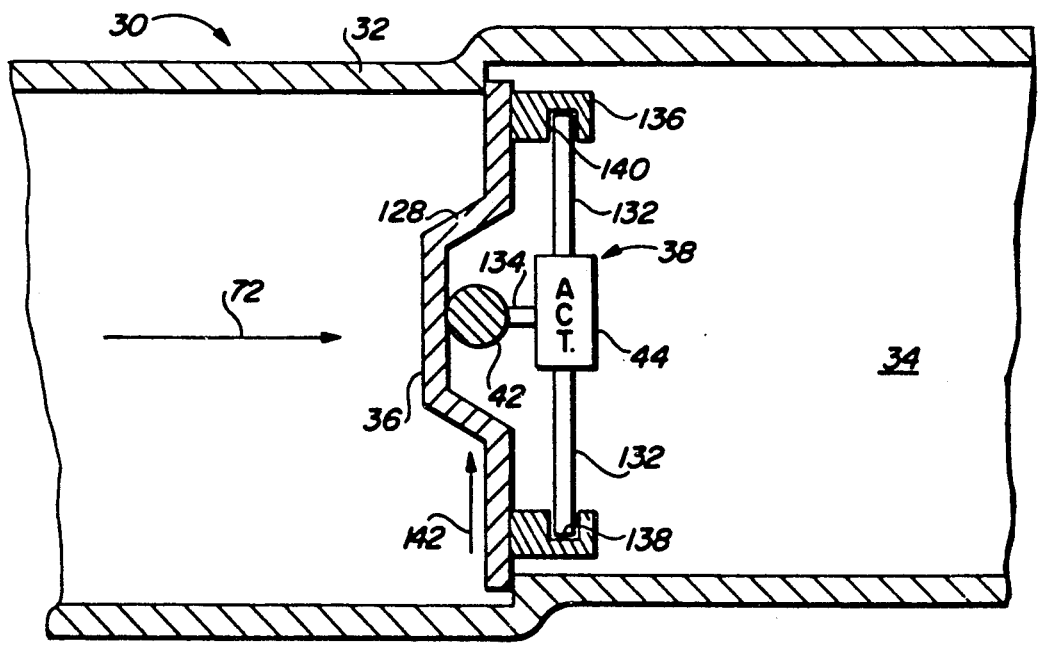

FIGS. 12 and 13 illustrate additional embodiments of the invention. In FIG. 12, the pivot shaft 42 extends through the plate 36 in the conventional manner and is rotatably secured to the duct 32. The output shaft 50 of the actuator 38 is rigidly secured to a gate member 92 which cooperates with a hole 90 to form a pilot valve 94. Air is supplied to the pressure chamber (not shown) via a conduit 126 which extends through the duct 32. The valve 30 is opened to varying degrees depending on the degree to which the hole 90 is uncovered by the gate member 92.

In FIG. 13, a stepped duct 32 is employed so that initial opening can be effected by translation of the plate 36 relative to the shaft 42. The plate 36 has an annular portion 128 which is non-parallel to the remainder for reasons set forth below. The actuator 38 is a bi-directional motor having a jackscrew-type output shaft 132, which is movable relative to the housing 44, the housing being centered in the flow path 34. The actuator 38 and pivot shaft 42 are intersecured by a suitable connecting member 134 and cylindrical sleeve 52 (FIG. 2) so that the actuator is revolvable about the shaft. As in the embodiment of FIG. 2, the pivot shaft 42 is rigidly secured to the duct 32, and rack and pinion gears 58,56 (FIG. 2) are provided on the plate 36 and pivot shaft, respectively. However, bearings (not shown) are provided between the pinion gears 56 and pivot shaft 42 so that the pinion gears are easily rotated around the shaft. The ends of the output shafts 132 abut lugs (as at 136) that are welded to the plate 36. The lugs 136 have abutment surfaces (as at 138), and surfaces (as at 140) which are suitably threaded for engagement with the output shaft 132. Electrical communication to the actuator 38 is provided through channels (not shown) formed in the pivot shaft 42 and connecting member 134. The plate 36 is thus translatable in either direction transverse to the pivot shaft 42 in response to signals communicated to the actuator 38.

Testing has shown that for those embodiments in which the plate 36 is revolvable and translatable relative to the pivot shaft 42, stability problems may be encountered as a result of hydrodynamic forces which act in a direction parallel to the plate. Stability is considerably improved if the plate 36 is configured so that these forces (represented in sum by arrow 142) tend to close the butterfly valve 30. In the embodiment of FIG.

13, this is accomplished by providing the annular portion 128.

The word "actuator" as used herein is intended to mean any device which can be used or adapted for use with this invention and which produces a mechanical response to a hydraulic, pneumatic, or electronic input to the device delivered from an external source. Examples of actuators meeting this definition are electronically-actuated stepping motors, hydraulically or pneumatically actuated motors, and solenoids.

The term "fully open" as used in reference to the valve 30 or to the position of the plate 36 is intended to mean that position of the plate which in any particular design provides for maximum flow through the valve. Depending on the design, that position may or may not be such that the plate is parallel to the flow path 34.

The reader should understand that the foregoing text and accompanying drawings are not intended to restrict the scope of the invention to specific details which are ancillary to the teaching contained herein. Accordingly, the invention should be construed in the broadest manner which is consistent with the following claims and their equivalents.

What is claimed is:

1. Butterfly valve apparatus comprising a duct defining an elongate flow path for fluid, a plate-like valve member disposed in said flow path and rotatable between a closed position spanning said flow path to close fluid communication therethrough and a fully open position associated with maximum fluid communication through said flow path, and a motor disposed in said path logic carried by said valve member for moving the latter between said closed position and said fully open position.

2. The invention of claim 1 further comprising pivot means for providing an axis of rotation spanning said flow path, said valve member being rotatably secured to said pivot means and rotatable about said axis between said closed and fully open positions.

3. The invention of claim 1 further comprising pivot means for providing an axis of revolution spanning said flow path, said valve member being secured to said pivot means such that said member is revolvable and translatable relative to said axis.

4. The invention of claim 3 wherein said motor is cooperable with said pivot means to effect revolutionary movement of said valve member relative to said axis in order to move said member away from said closed position.

5. The invention of claim 4 wherein said valve member is secured to said pivot means so as to be translatable relative to said axis and in a direction parallel to said valve member when said member is at least partially open.

6. The invention of claim 5 wherein said motor is secured to said pivot means and operable therewith to translate said valve member relative to said axis when said member is at least partially open.

7. The invention of claim 6 wherein said pivot means has a longitudinally extending passage for providing communication between said motor and an external source of energy.

8. The invention of claim 5 wherein said valve member has a hole formed therethrough, and further comprising gate means carried on said member and cooperative with said hole for forming a pilot valve, said motor being operatively associated with said gate means to open said pilot valve.

9. The invention of claim 8 wherein an abutment is provided on said valve member, said motor being cooperable with said pivot means and said abutment to translate said valve member relative to said axis when said valve member is in an open position 10. The invention of claim 8 further comprising:
stop means secured to or integral with said valve member for defining a reference position of said valve member relative to said axis, said reference position being a position of said valve member relative to said axis when said valve member is at said closed position and biasing means for urging said valve member toward said reference position.
biasing means for urging said valve member toward said reference position.

11. The invention of claim 8 further comprising biasing means for urging said pilot valve closed.

12. The invention of claim 8 wherein said pivot means has a longitudinally extending passage for providing communication between said motor and an external source of energy.

13. The invention of claim 12 wherein said motor is substantially centered relative to a portion of said axis which spans said valve member.

14. The invention of claim 3 wherein said motor is secured to said pivot means and operable to translate said valve member relative to said axis when said member is at least partially open.

15. The invention of claim 3 wherein said motor is secured to said pivot means.

16. The invention of claim 15 wherein said motor is secured to said pivot means so as to be revolvable thereabout when carried by said valve member.

17. The invention of claim 16 wherein said pivot means defines a passage for providing communication between said motor and an external source of energy.

18. The invention of claim 17 wherein said motor is substantially centered relative to a portion of said axis defined by said duct.

19. The invention of claim 16 further comprising retaining means rigidly secured to said valve member for movably securing said member to said pivot means.

20. The invention of claim 15 wherein said a motor is cooperable with said pivot means to translate said valve member relative to said axis.

21. The invention of claim 20 wherein said pivot means is secured to said duct so as to be displaceable in a direction transverse to said flow path and said axis.

22. The invention of claim 21 wherein said motor is operable to displace said pivot means in said direction when said member is in said closed position thereby translating said pivot means relative to said valve member, whereby in response to hydrodynamic forces exerted on said valve member by fluid in said flow path, said valve member rotates toward said fully open position.

23. The invention of claim 1 further comprising pivot means rigidly secured to said duct for providing an axis of revolution transversely spanning sid flow path, said valve member being secured to said pivot means such that said member is revolvable and translatable relative to said axis, said motor comprising an output shaft secured to said pivot means so as to be movable relative to said axis.

24. The invention of claim 23 further comprising mechanical timing means secured to said valve member and said pivot means for providing slip-free movement therebetween.

25. The invention of claim 1 further comprising a shaft transversely spanning said flow path and defining a longitudinal axis, said valve member being movably secured to said shaft.

26. The invention of claim 25 wherein said valve member is secured to said shaft so as to undergo translational movement relative to said shaft when rotationally moving between said closed position and said fully open position.

27. The invention of claim 1 wherein said motor is an electric motor.

28. Butterfly valve apparatus comprising a duct defining an elongate flow path for fluid, a plate-like valve member disposed in said flow path and rotatable between a closed position spanning said flow path to close fluid communication therethrough and a fully open position associated with maximum fluid communication through said flow path, actuator means carried by said valve member for moving the latter between said closed position and said fully open position, pivot means for providing an axis of revolution transversely spanning said flow path, said valve member being secured to said pivot means such tat said member is revolvable and translatable relative to said axis, said actuator means being revolvably secured to said pivot means, and retaining means comprising a generally C-shaped bracket member secured at its ends to said valve member for movably securing said member to said pivot means, said pivot means extending transversely across said flow path between said bracket member and said valve member.

29. Butterfly valve apparatus comprising a duct defining an elongate flow path for fluid, a plate-like valve member disposed in said flow path and rotatable between a closed position spanning said flow path to close fluid communication therethrough and a fully open position associated with maximum fluid communication trough said flow path, actuator means disposed in said path and carried by said valve member for moving the latter between said closed position and said fully open position, pivot means for providing an axis of revolution transversely spanning said flow path, said valve member being secured to said pivot means such that said member is revolvable and translatable relative to said axis, said actuator means comprising an output shaft and being secured to said pivot means so as to be revolvable thereabout, and mechanical timing means secured to said valve member and said pivot means for providing slip-free movement therebetween.

30. The invention of claim 29 wherein said mechanical timing means comprises a pinion gear rigidly secured to said shaft and a rack gear rigidly secured to said valve member an engaging said pinion gear.

31. The invention of claim 29 further comprising retaining means rigidly secured to said valve member for movably securing said member to said pivot means.

32. The invention of claim 31 wherein said retaining means comprises a generally C-shaped bracket member secured at its ends to said valve member, said pivot means extending between said bracket member and said valve member.

33. The invention of claim 29 wherein said actuator means is substantially centered relative to a portion of said axis defined by said duct.

34. A butterfly valve in which a motor is disposed in a flow path formed by a duct and is secured to a plate-like valve member such that said motor is carried with said member when the latter moves, and is operable to effect variable rotational movement of said member.

35. The invention of claim 34 wherein said butterfly valve further comprises a shaft extending across said flow path, said valve member being secured to said shaft and translatable relative thereto in a direction parallel to said valve member.

36. The invention of claim 35 wherein said motor is operable to translate said valve member relative to said shaft.

37. The invention of claim 34 wherein said motor is a pneumatic motor.

38. The invention of claim 34 wherein said motor is an hydraulic motor.

39. The invention of claim 34 wherein said motor is an electric motor.

40. A butterfly valve in which an actuator is disposed in a flow path formed by a duct and is secured to a plate-like valve member such that said actuator is carried with said member when the latter moves, said actuator being operable to effect variable rotational movement of said member, said valve additionally comprising a shaft defining a longitudinally extending passage for providing communication between said actuator and an external source of pressurized fluid.

41. A butterfly valve in which an actuator is secured to a plate-like valve member and is operable to variably open said valve, said actuator being carried with said member when the latter moves, said valve comprising a shaft defining a longitudinally extending passage for providing communication between said actuator and an external source of pressurized fluid, said member being secured to said shaft in such manner that said member is revolvable and translatably relative thereto, said valve further comprising means for providing slip-free movement of said member relative to said shaft, said actuator being operable to cause said member to roll around said shaft.

42. Butterfly-valve apparatus, comprising:
a duct forming an elongate flow path for fluid;
a shaft extending across said flow path and having a longitudinal axis, said shaft being rotatable about sid axis;
a plate-like valve member disposed in said flow path substantially parallel to said shaft, said member being secured to said shaft so as to be movable relative thereto; and
a motor having a housing secured to said valve member and an output shaft extending outwardly from said housing, said motor being secured to said valve member such that said output shaft is revolvable relative to said longitudinal axis.

43. The invention of claim 42 wherein said housing is secured to said valve member so as to be movable relative thereto and carried therewith when the valve member rotates.

44. The invention of claim 42 wherein said shaft has an axially-extending passage for providing communication between said motor and an external source of energy.

45. The invention of claim 42 wherein said valve member is translatable relative to said shaft in directions substantially perpendicular to said shaft and parallel to said valve member.

46. The invention of claim 45 wherein said valve member, said shaft, and said motor are intersecured in such manner that said motor is operable to effect revolutionary movement of said valve member relative to said shaft, said movement effecting translational of said valve member relative to said shaft.

47. Butterfly valve apparatus comprising a duct defining an elongate flow path for fluid, a plate-like valve member disposed in said flow path and rotatable between a closed position spanning said flow path to close fluid communication therethrough and a fully open position associated with maximum fluid communication through said flow path, and actuator means comprising a fluid-driven motor disposed in said path and carried by said valve member for moving the latter between said closed position and said fully open position.

48. The invention of claim 47 wherein said motor is a pneumatic motor.

49. The invention of claim 48 further comprising a shaft extending across said flow path and supporting said valve member, said shaft defining a longitudinally extending passage for providing communication between said motor and a source of pressurized air.

50. Butterfly valve apparatus comprising a duct defining an elongate flow path for fluid, a plate-like valve member disposed in said flow path and rotatable between a closed position spanning said flow path to close fluid communication therethrough and a fully open position associated with maximum fluid communication through said flow path, actuator means disposed in said path and carried by said valve member for moving the latter between said closed position and said fully open position, and a shaft transversely spanning said flow path, said valve member being secured to said shaft so as to be movable relative thereto, said actuator means being operable to effect translational movement of said valve member relative to said shaft in directions which are perpendicular to said shaft and non-perpendicular to said valve member.

51. Butterfly valve apparatus comprising a duct defining an elongate flow path for fluid, a plate-like valve member disposed in said flow path and rotatable between a closed position spanning said flow path to close fluid communication therethrough and a fully open position associated with maximum fluid communication through said flow path, actuator means disposed in said path and carried by said valve member for moving the latter between said closed position and said fully open position, and a shaft transversely spanning said flow path, said valve member being secured to said shaft so as to be movable relative thereto, said valve member, shaft, and actuator means being intersecured such that said actuator means is operable to effect translational movement of said valve member relative to said shaft while maintaining said valve member at a substantially constant distance from said shaft.

52. The invention of claim 51 wherein said actuator means comprises a fluid-driven motor.

53. The invention of claim 52 wherein said actuator means comprises a piston-type, fluid-driven motor.

* * * * *

UNITED STATES PATENT AND TRADEMARK OFFICE
CERTIFICATE OF CORRECTION

PATENT NO. : 5,195,719
DATED : 3/23/93
INVENTOR(S) : LARRY K. BALL ET AL

It is certified that error appears in the above-identified patent and that said Letters Patent is hereby corrected as shown below:

Column 7:

Claim 1, Line 8, please replace "logic" with --and--.

Column 8, please delete lines 14 and 15 which are between Claims 10 and 11.
Column 8:
Claim 23, Line 3, please replace "sid" with --said--.
Column 9:
Claim 29, Line 7, please replace "trough" with --through--.
Column 10:
Claim 42, Line 5, please replace "sid" with --said--.

Claim 46, Line 5, please replace "translational" with --translation--.

Signed and Sealed this

Thirtieth Day of November, 1993

Attest:

BRUCE LEHMAN

Attesting Officer

Commissioner of Patents and Trademarks